(12) United States Patent
Yoon

(10) Patent No.: US 6,760,143 B2
(45) Date of Patent: Jul. 6, 2004

(54) MICROMIRROR ACTUATOR

(75) Inventor: Yong-seop Yoon, Seoul (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 0 days.

(21) Appl. No.: 10/173,029

(22) Filed: Jun. 18, 2002

(65) Prior Publication Data

US 2003/0007235 A1 Jan. 9, 2003

(30) Foreign Application Priority Data

Jun. 23, 2001 (KR) .................................. 2001-36092

(51) Int. Cl.[7] .................................................. G02B 26/00
(52) U.S. Cl. ........................................ 359/290; 359/295
(58) Field of Search ............................. 359/290, 291, 359/292, 295, 222, 223, 224, 245; 310/90, 309

(56) References Cited

U.S. PATENT DOCUMENTS 6,431,714 B1 * 8/2002 Sawada et al. ............. 359/879
6,459,523 B2 * 10/2002 Ueda .......................... 359/290
6,487,011 B2 * 11/2002 Donath et al. .............. 359/399
2002/0141038 A1 * 10/2002 Mori .......................... 359/295
2003/0076576 A1 * 4/2003 Neukermans et al. ....... 359/291

FOREIGN PATENT DOCUMENTS

JP         8-21966        1/1996

* cited by examiner

Primary Examiner—Hung Xuan Dang
Assistant Examiner—Tuyen Tra
(74) Attorney, Agent, or Firm—Sughrue Mion, PLLC

(57) ABSTRACT

A micromirror actuator includes: a substrate; spring units elastically supported by protrusion formed on the substrate; a micromirror connected to the spring units and formed to be capable of rotating; trenches formed in the substrate at either side of the protrusions to correspond to the surface of the micromirror; and lower electrodes formed in each of the trenches. Accordingly, it is possible to expand the range of the driving angle of the micromirror with the use of a lower voltage.

8 Claims, 7 Drawing Sheets

MICROMIRROR ACTUATOR

BACKGROUND OF THE INVENTION

1. Field of the Invention

The present invention relates to a micromirror actuator and, more particularly, to a micromirror actuator, which can be driven by attractive electrostatic forces and can have a wide range of driving angles with the use of a low driving voltage.

This application is based on Korean Patent Application No. 2001-36092 filed on Jun. 23, 2001, the disclosure of which is incorporated herein by reference in its entirety.

2. Description of the Related Art

Micromirrors are generally used in various fields including an optical communication field. For example, micro-optical cross connects (MOXCs) are devices for selecting an optical path and thus allowing an optical signal to be transmitted from an input terminal to a predetermined output terminal, and micromirrors are the most important components of MOXC.

Micromirror actuators, which can maintain a micromirror at a predetermined angle, have been manufactured by using many different methods and having various structures. FIGS. 1A and 1B are views illustrating a conventional micromirror actuator using attractive electrostatic forces and including an elastic element, such as a torsion spring. Referring to FIGS. 1A and 1B, a micromirror 14 is formed horizontally, over a substrate 11 with a spring unit 13 supported by a protrusion 12 formed on the substrate 11. The micromirror 14 is formed to be capable of rotating, and a lower electrode 15 is formed under the micromirror 14. If external voltage is applied to the micromirror 14 and the lower electrode 15, attractive electrostatic forces are generated between the micromirror 14 and the lower electrode 15, as shown in FIG. 1B. Due to the electrostatic forces, the micromirror 14 supported by the spring unit 13 inclines over the substrate 11 at a predetermined angle.

The range, in which the driving angle of the micromirror actuator driven by attractive electrostatic forces can be controlled by external voltage, is strictly restricted due to the special characteristics of the method of driving the micromirror actuator. In other words, if a voltage not less than a predetermined level, i.e., threshold voltage, is applied between the spring unit 13 and the micromirror 14, attractive electrostatic force generated by the applied voltage is always stronger than the elastic restoring force of the spring unit 13. Thus, the distance between the micromirror 14 and the lower electrode 15 becomes shorter. This can be described more thoroughly with reference to Equation (1).

$$F = \frac{\varepsilon A V^2}{d^2} \quad (1)$$

In Equation (1), F represents an attractive electrostatic force, $\varepsilon$ represents a dielectric constant, A represents the area of an electrode, V represents a potential difference, and d represents the distance between the electrodes. In general, the intensity of the attractive electrostatic force acting between the electrodes is inversely proportional to the square of the distance between the electrodes but is proportional to the square of a voltage applied to the electrodes. Accordingly, as the distance d between the electrodes decreases, the influence of the voltage applied to the electrodes on the attractive electrostatic force between the electrodes increases. In addition, the range, in which the driving angle of a micromirror can be controlled by the voltage applied to the electrodes, becomes very sensitive to a potential difference between the electrodes.

On the other hand, as the distance d between the electrodes increases, the influence of the voltage applied to the electrodes on the attractive electrostatic force between the electrodes, decreases, and the range, in which the driving angle of a micromirror can be controlled by the voltage applied to the electrodes, expands. However, the voltage applied to the electrodes must be increased to obtain a desired angle of the micromirror, and the height of a sacrificial layer formed in manufacturing of a micromirror actuator must be increased.

SUMMARY OF THE INVENTION

To solve the above-described problems, it is an aspect of the present invention to provide a micromirror actuator, which is capable of obtaining a larger driving angle with the use of a lower driving voltage by forming a stepped electrode in a trench (thus lower than in FIGS. 1A and B) so as to make the difference between the lower electrode and a micromirror vary.

According to the present invention, a micromirror actuator comprises a substrate, spring units elastically supported by protrusions formed on the substrate, a micromirror connected to the spring units and capable of rotating, trenches formed in the substrate at either side of the protrusions to correspond to the surface of the micromirror and lower electrodes formed in each of the trenches. Lower electrodes may include an electrode formed at the bottom and sidewall of each of the trenches or between the trenches. Trenches may have vertical, slanted or stepped sidewalls. Further, in order to enlarge the range of the driving angle of the micromirror, the distance between the lower electrodes and the micromirror is varied as well as the distance between the lower electrodes and their size.

BRIEF DESCRIPTION OF THE DRAWINGS

The above aspects and advantages of the present invention will become more apparent by describing in detail illustrative and non-limiting embodiments thereof with reference to the accompanying drawings, in which.

DETAILED DESCRIPTION OF THE INVENTION

Figure 1A:
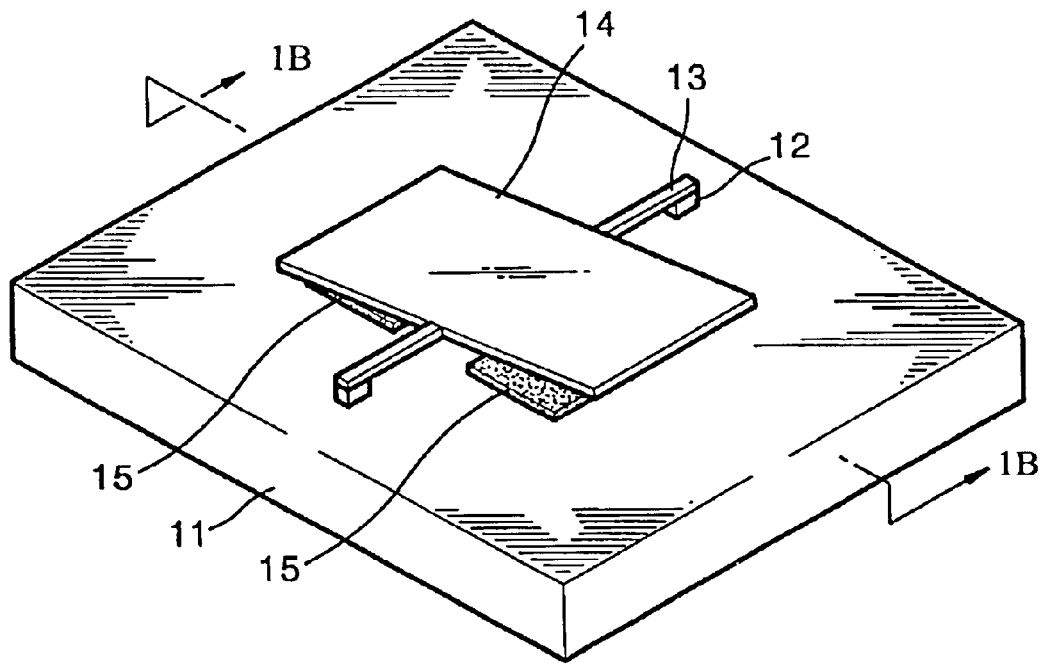
FIG. 1A is a perspective view of a conventional micromirror actuator.

The present invention will now be described in detail by describing illustrative, non-limiting embodiments thereof with reference to the accompanying drawings. In the drawings, the same reference characters denote the same elements.

Figure 2A:
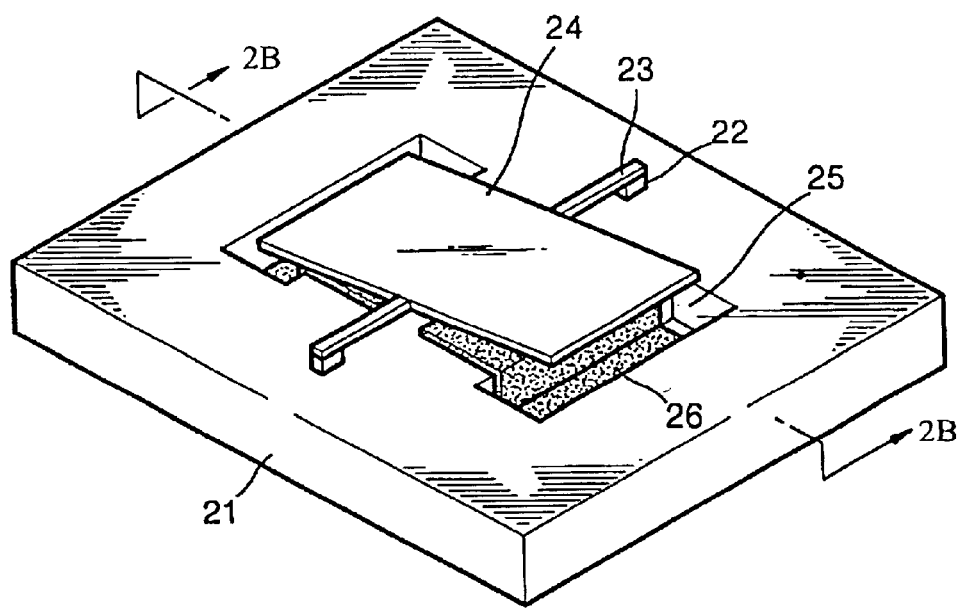
FIG. 2A is a perspective view of a micromirror actuator according to a first illustrative and non-limiting embodiment of the present invention.
Figure 2B:
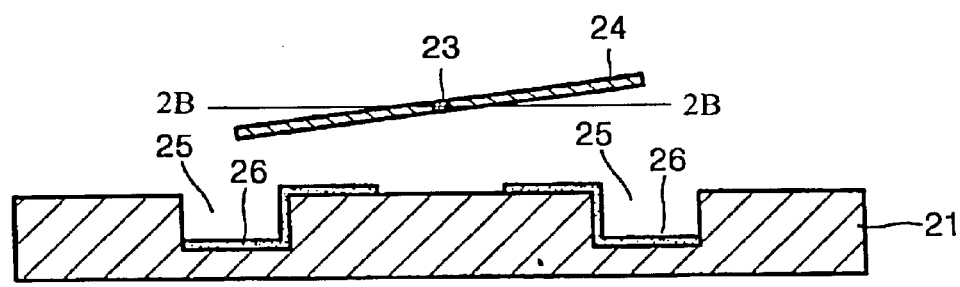
FIG. 2B is a cross-sectional view of the micromirror actuator according to a first illustrative and non-limiting embodiment of the present invention, taken along line 2B—2B of FIG. 2.

FIGS. 2A and 2B are views showing a micromirror actuator according to a first illustrative and non-limiting embodiment of the present invention. Specifically, FIG. 2A is a perspective view of a micromirror actuator according to a first illustrative and non-limiting embodiment of the present invention, and FIG. 2B is a cross-sectional view of the micromirror actuator according to the first embodiment of the present invention, taken along line 2B—2B of FIG. 2A. As shown in FIG. 2A, protrusions 22 are formed on a substrate 21, in which trenches 25 are formed, and a micromirror 24 is formed to be capable of rotating due to spring units 23 elastically supported by the protrusions 22. Lower electrodes 26 are formed in the trenches 25, i.e., at the bottom and the sidewall of the trenches 25. Also, the lower electrode 26 may be formed on the substrate 21 between the trenches 25.

The micromirror actuator according to the present invention is driven by attractive electrostatic force, and the attractive electrostatic force is induced by a potential difference between the micromirror 24 and the lower electrodes 26. The operational principle of the micromirror actuator having such a structure will be described as follows.

If external voltage is applied to the micromirror 24 and the lower electrode 26, attractive electrostatic force is generated between the micromirror 24 and the lower electrodes 26 and thus the micromirror 24 begins to rotate. The rotation angle of the micromirror 24 is determined by mechanical equilibrium between the intensity of the attractive electrostatic force affecting the micromirror 24 and the restoring torque of the spring-unit 23 supported by the protrusions 22.

Here, torque induced by the attractive electrostatic force generated between the micromirror 24 and the lower electrodes 26 are determined as the sum of torques induced by horizontal and vertical electrodes included in the lower electrodes 26. In addition, torques induced by the horizontal electrodes are determined as the sum of torques induced by electrodes formed at the bottom of the trenches 25 and on the substrate 21 between the trenches 25. The restoring torque of the spring units 23 is determined as the spring constant of the spring units 23 multiplied by the rotation angle of the micromirror 24. These relations mentioned above will be described with reference to FIG. 3, and torque induced by attractive electrostatic force generated between the horizontal electrodes and the micromirror 24 can be expressed by Equation (2A).

$$T_h = \int_0^L F_h x dA = \int_0^{L_a} F_h x dA + \int_{L_a}^L F_h x dA \quad (2A)$$

$$= \frac{\varepsilon W V^2}{2\theta^2} \left\{ \frac{L_a \sin\theta}{g \cdot L_a \sin\theta} + \ln\left(1 - \frac{L_a \sin\theta}{g}\right) + \frac{L \sin\theta}{d + g - L\sin\theta} + \ln\left(1 - \frac{L\sin\theta}{d+g}\right) - \left(\frac{L_a \sin\theta}{d + g - L_a \sin\theta} + \ln\left(1 - \frac{L_a \sin\theta}{d+g}\right)\right) \right\}$$

Figure 3:
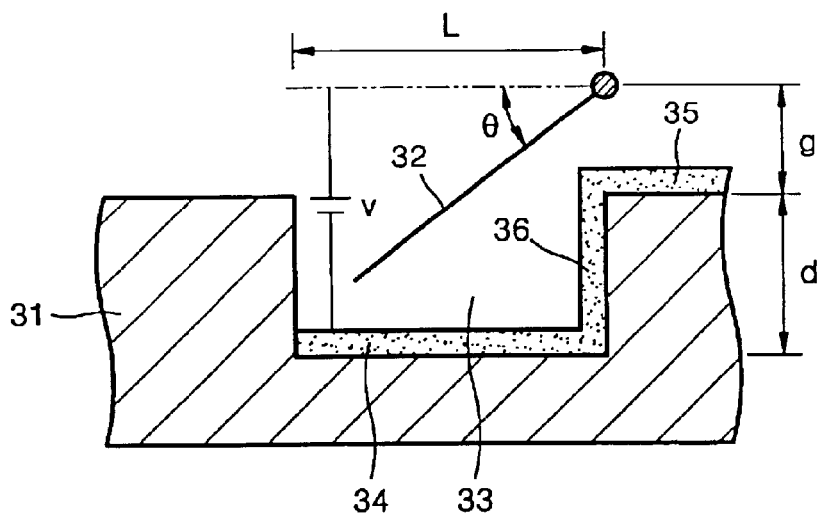
FIG. 3 is a view illustrating the operational principle of the micromirror actuator according to a first illustrative and non-limiting embodiment of the present invention.

In Equation (2A), $T_h$ represents torque induced by attractive electrostatic force generated between horizontal electrodes 34 and 35, and a micromirror 32, shown in FIG. 3. $F_h$ represents attractive electrostatic force generated by the horizontal electrodes 34 and 35, L represents the distance from the rotation axis of the micromirror 32 and either end of the micromirror 32, $\varepsilon$ represents a dielectric constant (of lower electrodes), $\theta$ represents the rotation angle of the micromirror 32, d represents the depth of a trench 33, and g represents the vertical distance between the micromirror 32 and a substrate 31.

Torque induced by attractive electrostatic force generated between a vertical electrode 36 and the micromirror 32 can be expressed by Equation (2B).

$$T_v = \int_{g_a}^L F_v dA = \int_{g_a}^L \frac{\varepsilon W V^2}{\left[\left(\frac{x}{2} - \theta\right)x - \left(\frac{\pi}{2} - \theta_A\right)\right]^2} x dx \quad (2B)$$

$$= \frac{B}{A^2(AL+B)} + \frac{1}{A^2}\text{Ln}(AL+B) - \frac{B}{A^2(Ag_a+B)} - \frac{1}{A^2}\ln(Ag_a+B)$$

In Equation (2B), $T_v$ represents torque induced by the vertical electrode 36, and $F_v$ represents attractive electrostatic force generated between the vertical electrode 36 and the micromirror 32. In addition, $$g_a = \sqrt{L_a^2 + g^2}, \ \theta_a = \tan^{-1}\left(\frac{g}{L_a}\right), \text{ and } B = g_a\left(\theta_A - \frac{\theta}{2}\right).$$

Accordingly, supposing that $T_t$ represents torque affecting the micromirror 32, $T_t=T_h+T_v$, and the rotation angle of the micromirror 32 is determined when $T_t=T_r$.

The operation of the micromirror actuator according to the present invention will be described below. In a state where external voltage is not applied to the micromirror 32 and the lower electrodes 34, 35, and 36, in other words, in a state where no external force is applied between the micromirror 32 and the lower electrodes 34, 35, and 36, the micromirror 32 is kept in a horizontal position. On the other hand, if external voltage is applied to the micromirror 32 and the lower electrodes 34, 35, and 36, attractive electrostatic force is generated between the micromirror 32 and the lower electrodes 34, 35, and 36 and thus the micromirror 32 begins to rotate so that the micromirror 32 comes close to the lower electrodes 34, 35, and 36. As the micromirror 32 comes closer to the trench 33, attractive electrostatic force generated between the vertical electrode formed on the sidewall of the trench 33 and the micromirror 32 becomes stronger so that the micromirror 32 can further rotate. As described above, the micromirror 32 rotates due to an attractive electrostatic force between the micromirror 32 and the lower electrodes 34, 35, and 36. Finally, if the restoring torque of the spring unit 32 increases to be equal to torque induced by the attractive electrostatic force generated between the micromirror 32 and the lower electrodes 34, 35, and 36, the micromirror 32 maintains a predetermined rotation angle θ.

Figure 1B:
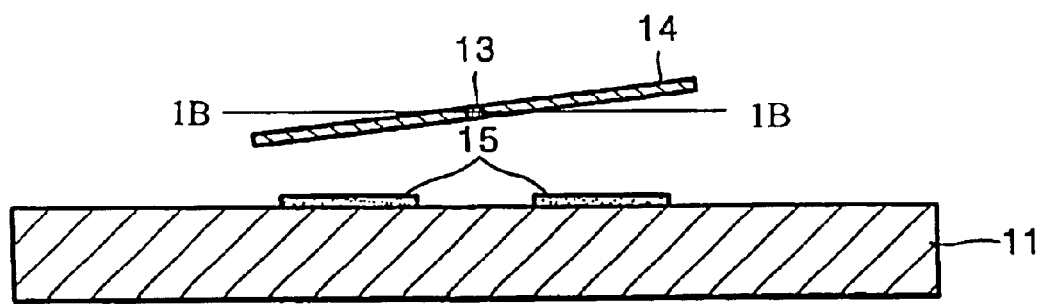
FIG. 1B is a cross-sectional view of the micromirror actuator, taken along line 1B—1B of FIG. 1A.

FIGS. 4A through 4D are cross-sectional views of micromirror actuators, which are slightly different from the conventional micromirror actuator shown in FIGS. 1A and 1B in that the position of a lower electrode 43 and the distance between the lower electrode 43 and the micromirror 42 is different. FIGS. 5A through 5D are graphs showing variations of torque $T_t$ induced by attractive electrostatic force between the lower electrode 43 and the micromirror 42 and torque $T_r$ induced by the repulsive force of a spring with respect to the rotation angle θ of the micromirror 42 when a predetermined external voltage (V=V$_0$=55 V) is applied to the micromirror actuators of FIGS. 4A through 4D, respectively.

These simulations are performed to find the operational modes of micromirror actuators according to the present invention.

Figure 4A:
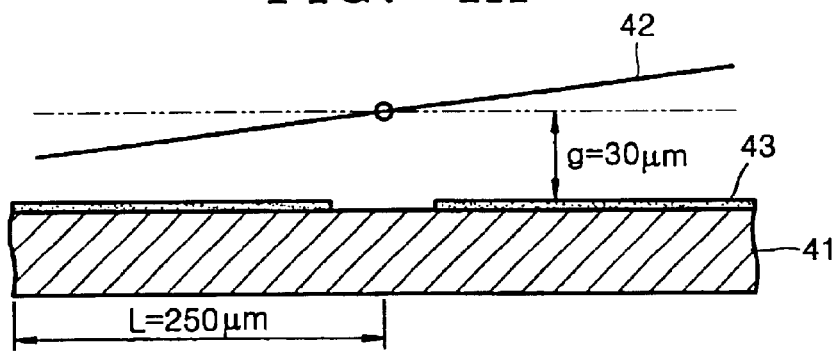
FIGS. 4A through 4D are cross-sectional views of micromirror actuators, which have almost the same structure as the micromirror actuator shown in FIGS. 1A and 1B and are different from one another in the length of the electrodes and the vertical distance between the micromirror and the electrodes, which is varied in order to obtain the operating modes of the present invention.
Figure 5A:
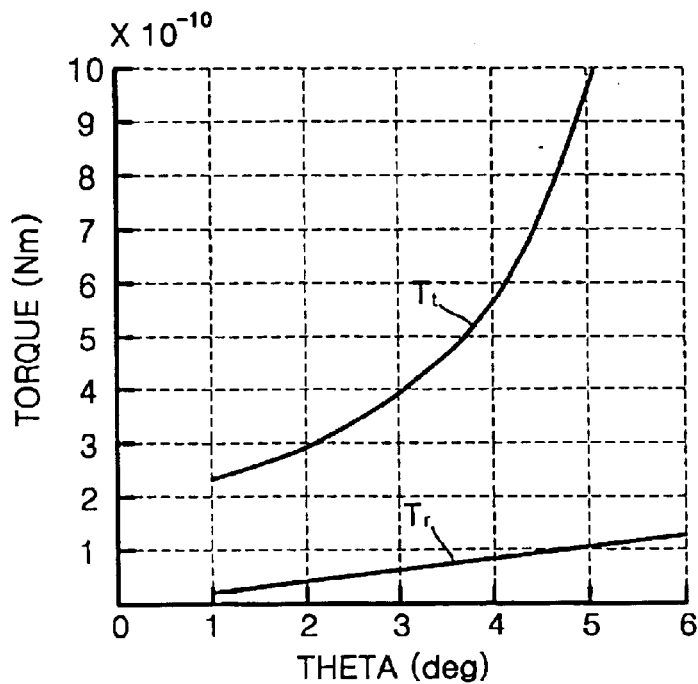
FIGS. 5A through 5D are graphs showing variations of torque induced by the repulsive force of a spring and torque generated between a micromirror and a lower electrode with respect to the rotation angle of the micromirror during operation of each of the micromirror actuators shown in FIGS. 4A through 4D, respectively.

In the case of the micromirror actuator shown in FIG. 4A, the lower electrode 43 is formed to be longer than the lower electrode 15 shown in FIG. 1B so that the area of the opposing surface of each of the lower electrode 43 and the micromirror 42 can be enlarged. As shown in FIG. 5A, torque $T_t$ induced by attractive electrostatic force generated between the lower electrode 43 and the micromirror 42 is always stronger than torque $T_r$ induced by the repulsive force of a spring, and thus there is no equilibrium point between the torques $T_t$ and $T_r$, in which case it is impossible to control the rotation angle of the micromirror 42.

Figure 4B:
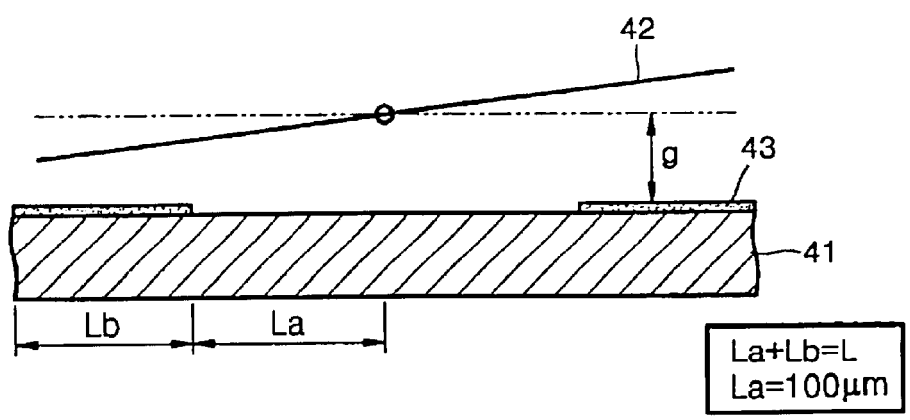
Figure 5B:
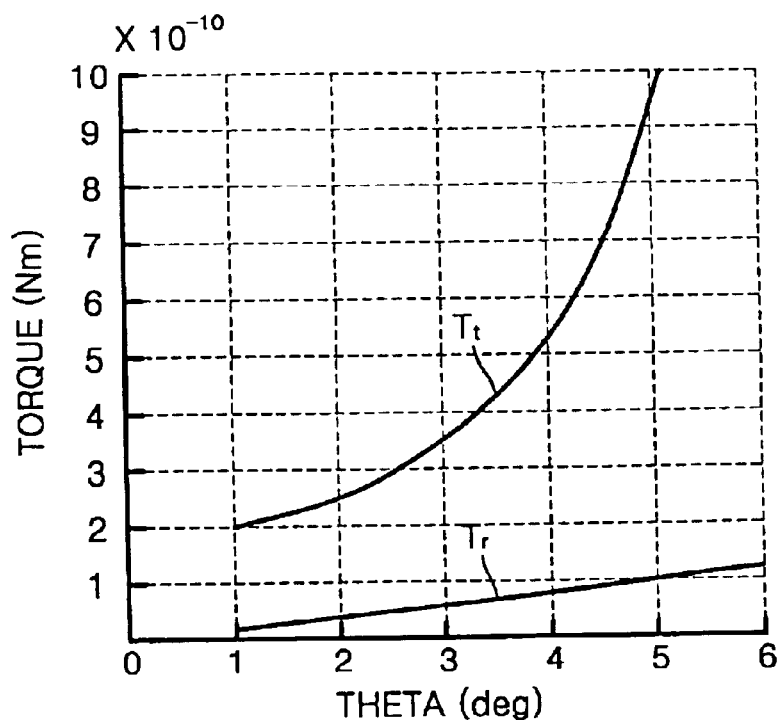

In the case of the micromirror actuator shown in FIG. 4B, the lower electrode 43 is located relatively far away from the rotation axis of the micromirror 42 so that the area of the opposing surface of each of the lower electrode 43 and the micromirror 42 is small. As shown in FIG. 5B, there is no equilibrium point between the torques $T_t$ and $T_r$, like in FIG. 5A.

Figure 4C:
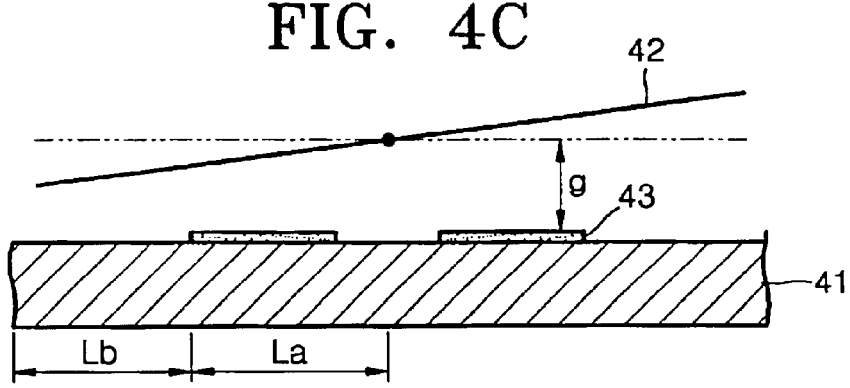
Figure 5C:
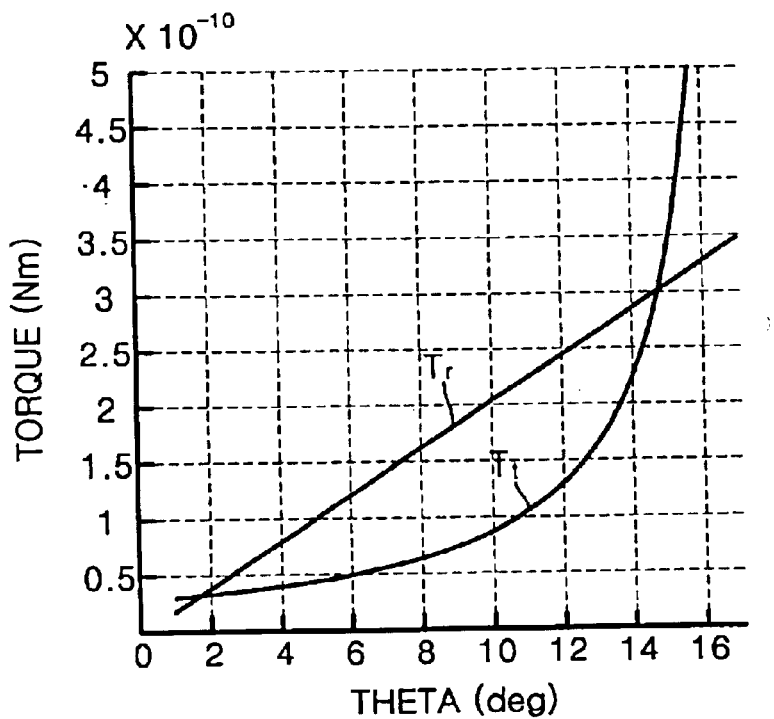

In the case of the micromirror actuator shown in FIG. 4C, the lower electrode 43 is located relatively close to the rotation axis of the micromirror 42 so that the area of the opposing surface of each of the lower electrode 43 and the micromirror 42 is small. Referring to FIG. 5C, equilibrium points exist between the torque $T_t$ induced by attractive electrostatic force generated between the lower electrode 43 and the micromirror 42 and the torque $T_r$ induced by the repulsive force of a spring, and thus an equilibrium state, in which the micromirror 42 stops rotating and maintains a predetermined rotation angle, exists. However, in the equilibrium state, the rotation angle of the micromirror 42 is approximately below 2 degrees, and the micromirror actuator is not considered useful.

Figure 4D:
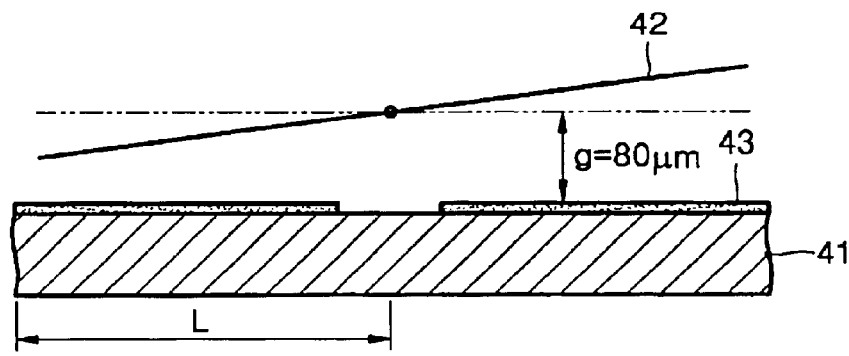
Figure 5D:
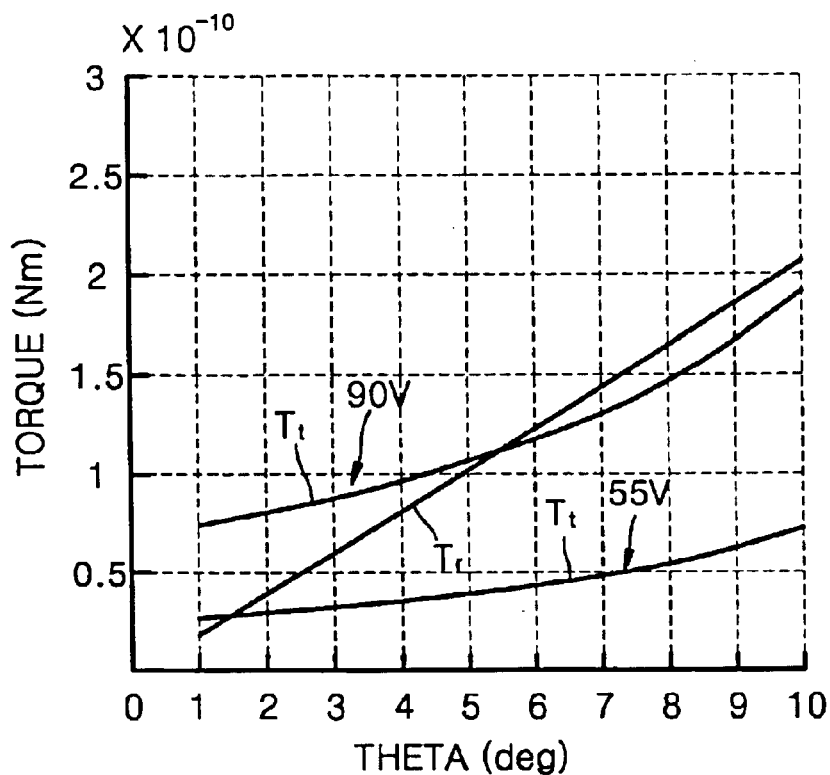

The micromirror actuator shown in FIG: 4D is the same as the micromirror actuator shown in FIG. 4A except for the vertical distance g between the micromirror 42 and a substrate 41. In other words, the vertical distance g between the micromirror 42 and the substrate 41 of the micromirror actuator shown in FIG. 4D is longer than the vertical distance g between the micromirror 42 and the substrate 41 of the micromirror actuator shown in FIG. 4A. Referring to FIG. 5D, an equilibrium point exists between the torque $T_t$ induced by attractive electrostatic force generated between the lower electrode 43 and the micromirror 42 and the torque $T_r$ induced by the repulsive force of a spring, unlike in FIG. 5A. However, in this case, the rotation angle of the micromirror 42 is very small. Accordingly, in order to achieve an equilibrium state of the rotation angle of the micromirror 42, the voltage applied to the micromirror 42 and the lower electrode 43 must be increased to about 90 V, as shown in FIG. 5D.

Figure 6A:
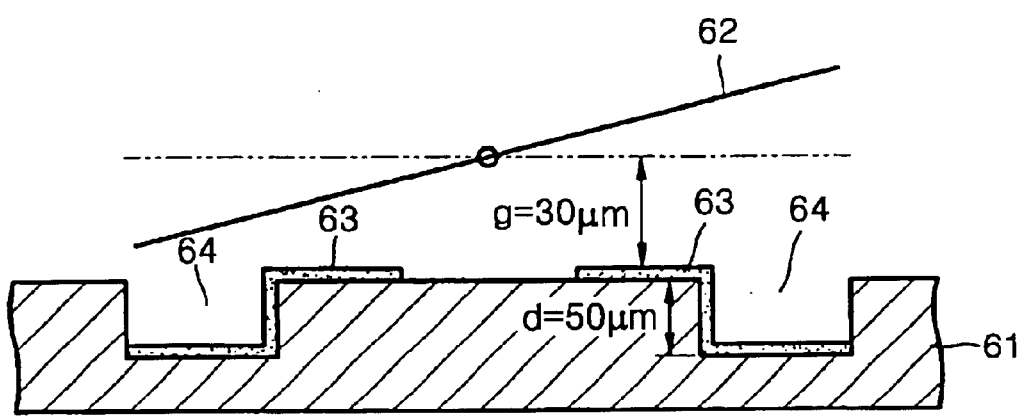
FIG. 6A is a cross-sectional view of a micromirror actuator according to a first illustrative and non-limiting embodiment of the present invention, which is formed to have the same variable values as the micromirror actuator shown in FIG. 4D.
Figure 6B:
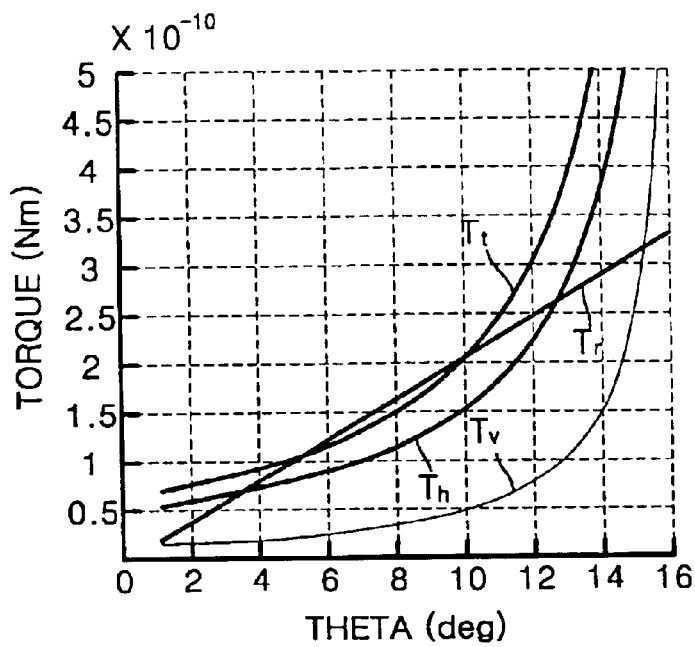
FIG. 6B is a graph showing variations of torque induced by attractive electrostatic force and torque induced by the repulsive force of a spring with respect to the rotation angle of a micromirror.

FIG. 6A is a cross-sectional view of a micromirror actuator according to a first, illustrative and non-limiting embodiment of the present invention, which is formed to have the same variable values as the micromirror actuator shown in FIG. 4D. FIG. 6B is a graph showing torque $T_t$ induced by attractive electrostatic force and torque $T_r$ induced by the repulsive force of a spring. As shown in FIGS. 6A and 6B, an equilibrium point exists between the torque $T_t$ induced by an attractive electrostatic force generated between a micromirror 62 and a lower electrode 63 and the torque $T_r$ induced by the repulsive force of a spring. At this point the rotation angle of the micromirror 62 is about 6 degrees and is greater than in the prior art. The rotation angle of the micromirror 62 can be increased more considerably by adjusting the vertical distance g between the micromirror 62 and a substrate 61 and by varying the depth of a trench 64.

Figure 7:
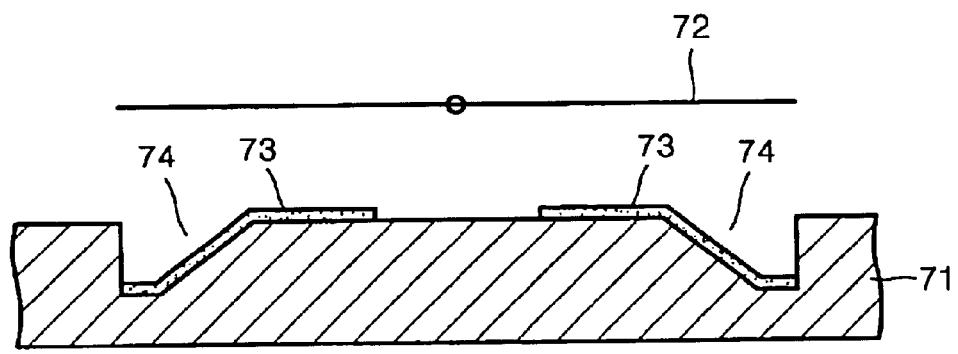
FIG. 7 is a cross-sectional view of a micromirror actuator according to a second illustrative and non-limiting embodiment of the present invention.

FIG. 7 is a cross-sectional view of a micromirror actuator according to a second, illustrative and non-limiting embodiment of the present invention. In the second embodiment, unlike in the first embodiment, trenches 74 are formed in a substrate 71 to have a slanted sidewall, and lower electrodes 73 are formed along the slanted sidewall of the trench 74. In the second, illustrative and non-limiting embodiment, the distance between the micromirror 72 and the lower electrodes 73 is shorter during the rotation of the micromirror 72 than the distance between the micromirror 62 and the lower electrode 64 in the first embodiment, and thus the range, within the driving angle of the micromirror 72 can be varied, can be enlarged more considerably.

Figure 8:
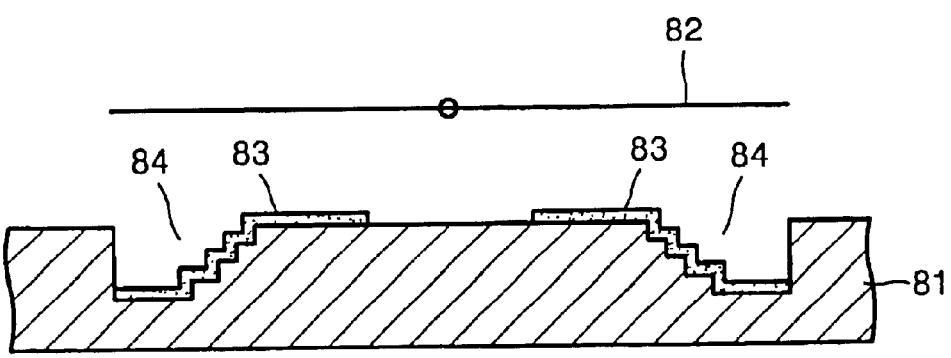
FIG. 8 is a cross-sectional view of a micromirror actuator according to a third illustrative and non-limiting embodiment of the present invention.

FIG. 8 is a cross-sectional view of a micromirror actuator according to a third, illustrative and non-limiting embodiment of the present invention. Referring to FIG. 8, a trench 84 is formed in a substrate 81 to have a stepped sidewall so that the distance between a lower electrode 83 formed along the stepped sidewall of the trench 84 and a micromirror 82 can be shorter than the distance between the lower electrode 73 and the micromirror 72 in the second embodiment, and thus the area of the opposing surface of each of the lower electrode 83 and the micromirror 82 can be expanded more.

According to the present invention, a microactuator is formed to include a trench, and electrodes are formed at the bottom and sidewall of the trench. Thus, it is possible to reduce voltage necessary to rotate a micromirror with a predetermined rotation angle. In addition, it is possible to realize a micromirror actuator having a wide range of driving angles by adjusting the voltage applied to the micromirror actuator. The micromirror actuator according to the present invention may be used in various fields including an optical communication field. For example, the micromirror actuator according to the present invention may be applied to devices using optical signals, such as a scanner, a display device, or an optical switch.

The above and other features of the invention including various and novel details of construction and combination of parts has been particularly described with reference to the accompanying drawings and pointed out in the claims. It will be understood that the particular construction and combination of parts embodying the invention is shown by way of illustration only and not as a limitation of the invention. The principles and features of this invention may be employed in varied and numerous embodiments without departing from the scope of the invention.

What is claimed is:

1. A micromirror actuator comprising:
   a substrate having protrusions;
   spring units elastically supported by the protrusions;
   a micromirror connected to the spring units and operative to rotate;
   trenches formed in the substrate at either side of the protrusions to correspond to a surface of the micromirror; and
   lower electrodes formed in each of the trenches.

2. The micromirror actuator of claim 1, wherein the lower electrodes further include an electrode formed on the substrate between the trenches.

3. The micromirror actuator of claim 2, wherein the lower electrodes are formed at the bottom and sidewall of each of the trenches.

4. The micromirror actuator of claim 3, wherein each of the trenches is formed to have one of a vertical sidewall and assaulted sidewall.

5. The micromirror actuator of claim 2, wherein each of the trenches is formed to have a stepped sidewall.

6. The micromirror actuator of claim 1, wherein distance between the lower electrodes and the micromirror is varied to enlarge the range of the driving angle of the micromirror.

7. The micromirror actuator of claim 1, wherein distance between the lower electrodes and size of the lower electrodes are varied to enlarge the range of the driving angle of the micromirror.

8. A micromirror actuator comprising:
   a substrate having protrusions on its upper main surface;
   spring units elastically supported by the protrusion;
   a micromirror connected to the spring units and operative to rotate;
   trenches formed in the main upper surface of the substrate at either side of the protrusions to correspond to a surface of the micromirror; and
   lower electrodes formed in each of the trenches.

* * * * *